(12) United States Patent
Varady et al.

(10) Patent No.: US 6,604,410 B2
(45) Date of Patent: Aug. 12, 2003

(54) METHOD AND SYSTEM TO DETECT SPARK LOSS IN A MULTIPLE SPARK PLUG PER CYLINDER INTERNAL COMBUSTION ENGINE

(75) Inventors: Arthur Joseph Varady, Chelsea, MI (US); John Michael Kacewicz, Riverview, MI (US); Lynn Edward Davison, Saline, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 71 days.

(21) Appl. No.: 09/848,474

(22) Filed: May 3, 2001

(65) Prior Publication Data

US 2002/0162534 A1 Nov. 7, 2002

(51) Int. Cl.[7] .............................................. G01M 15/00
(52) U.S. Cl. ........................................ 73/116; 73/117.3
(58) Field of Search ................................ 73/116, 117.3, 73/117.2, 35.01, 35.03, 35.06; 324/378–402; 123/425, 406.14

(56) References Cited

U.S. PATENT DOCUMENTS

| | | |
|---|---|---|
| 4,716,874 A | * 1/1988 | Hilliard et al. ........ 123/406.14 |
| 4,899,579 A | 2/1990 | Sweppy et al. |
| 5,226,322 A | 7/1993 | Armitage |
| 5,719,330 A | 2/1998 | Carr et al. |
| 5,872,312 A | 2/1999 | Kalweit |
| 6,006,156 A | * 12/1999 | Tozzi ..................... 123/406.14 |

* cited by examiner

*Primary Examiner*—Edward Lefkowitz
*Assistant Examiner*—Takisha S Miller
(74) *Attorney, Agent, or Firm*—John F. Buckert; Allan J. Lippa

(57) ABSTRACT

The invention is a strategy to detect spark plug misfires in a multiple spark plug per cylinder internal combustion engine (ICE). The present invention monitors spark plug misfires for each plug within each cylinder and initiates diagnostic fault code setting and failure mode actions such as modifying spark timing and the air/fuel ratio for the cylinder with the misfiring plug to optimize emissions and performance. The strategy modifies spark timing (such as spark retard) of a spark plug not under test but within the same cylinder of the tested spark plug and tests the tested spark plug for misfire (such as changes in crankshaft velocity or acceleration). The amount of spark retard invoked can be a calibrated value such as 30 or 50 degrees off Maximum Brake Torque (MBT) timing. The invention provides improvement over the prior art in that the strategy does not require the complete disabling of a spark plug within the same cylinder as the tested spark plug.

16 Claims, 2 Drawing Sheets

Baseline spark

10deg Retard from baseline -Cyl 1

30deg Retard from baseline -Cyl 1

50deg Retard from baseline -Cyl 1

Baseline spark, actual misfire induced -Cyl.1

METHOD AND SYSTEM TO DETECT SPARK LOSS IN A MULTIPLE SPARK PLUG PER CYLINDER INTERNAL COMBUSTION ENGINE

BACKGROUND OF THE INVENTION

1. Field of the Invention

The present invention relates in general to detecting spark plug misfires occurring during normal operation of an internal combustion engine (ICE) and, more specifically, to a strategy to determine spark plug misfires in an ICE having multiple spark plugs per cylinder.

2. Discussion of the Prior Art

As emission standards for internal combustion engines (ICEs) become increasingly stringent, there is a need for accurate engine misfire detection and reporting during normal engine operating conditions. Present ICE control systems often include engine misfire detection systems.

Systems that monitor an ICE's angular crankshaft velocity and crankshaft acceleration to detect engine misfires are well known in the prior art. Both measurements depend largely on engine torque produced (or not produced as expected) during an ICE's combustion stroke within each engine cylinder. Given the velocity or acceleration information, various signature analysis and/or spectral analysis methods predict or detect engine misfires.

The prior misfire detection systems are well suited for detecting misfires in single spark plug per cylinder applications since they typically seek to detect misfires based on entire cylinder event intervals as measured by, for example, a profile ignition pulse (PIP) signal. For example, in a four-cylinder engine, the PIP signal actually indicates a piston's approach to top dead center (also referred to as Maximum Brake Torque (MBT)) of two engine cylinders based on crankshaft position. In this example, one cylinder is approaching a power stroke and one cylinder is approaching an intake stroke. This is necessary since a four-stroke engine takes two full crankshaft rotations to complete an engine cycle. Associating unexpected crankshaft acceleration or velocity fluctuation rates with any particular cylinder can indicate potential spark plug misfires. See also generally, U.S. Pat. No. 4,899,579 to Sweppy et al, U.S. Pat. No. 5,719,330 to Carr et al., and U.S. Pat. No. 5,226,322 to Armitage.

Current technology allows an ICE to have more than one spark plug per cylinder to optimize the combustion process, thereby improving fuel economy and reducing emissions. Unfortunately, the prior art detection of ignition defects generally cannot be used. The loss of one spark plug in a cylinder having at least two spark plugs could be too small to measure. Nevertheless, the detection of the loss of one of the spark plugs in this type of ICE is still important to assure low vehicle emissions.

U.S. Pat. No. 5,872,312 to Kalweit provides a method to detect defective ignition systems in an ICE having at least two spark plugs per cylinder. This patent detects spark plug misfires by completely disabling one of the spark plugs and testing the remaining active spark plug for misfires. Unfortunately, if the active plug misfires the incomplete combustion of fuel present in the cylinder would occur. This can increase vehicle emissions and potentially damage the vehicle's catalytic converter if the unburned fuel reaches the catalytic converter.

Thus, an improved strategy to detect spark plug misfires in ICEs having multiple spark plugs per cylinder is needed to assure low vehicle emissions and to protect the vehicle's catalytic converter. This strategy must account for the small angular sampling differences for multiple spark plug cylinders.

SUMMARY OF THE INVENTION

Accordingly, the present invention provides a strategy to detect spark plug misfire in a multiple plug per cylinder internal combustion engine (ICE). The invention uses a controller to select one spark plug within the ICE to test, a controller to retard spark timing of a spark plug not selected for testing but within the same ICE cylinder as the spark plug selected for testing, and a spark plug misfire monitor to test the selected spark plug for misfire. The misfire monitor can measure crankshaft velocity or acceleration. A spark retard system modifies spark timing in relation to the crankshaft position needed for the piston head to reach top dead center of the cylinder in the ignition cycle. Spark retard can be a calibrated value such as 10, 30, or 50 degrees after optimum spark timing, also referred to as Maximum Brake Torque (MBT) timing, but 50 degrees is preferred because it affords a more pronounced detection signal. The optimum spark retard will be engine specific and somewhat dependent on the characteristics of the misfire monitor itself.

The present invention can also set diagnostic fault codes and initiate desired failure mode actions when a spark plug misfire is detected. These actions can include modifying spark timing and the air/fuel ratio for the cylinder with the misfiring plug to optimize emissions and performance. Halting fuel supply to the cylinder would be done under some circumstances if both spark plugs in a cylinder were misfiring.

The strategy can continue until all plugs within a cylinder are tested, then repeat the sequence until all cylinders are tested. The present invention is not limited to any particular sequence of spark plug testing so long as all spark plugs are tested within one cycle of the strategy.

The present invention provides improvement over the prior art in that the strategy does not require the complete disabling of a spark plug within the same cylinder as the tested spark plug.

Other objects of the present invention will become more apparent to persons having ordinary skill in the art to which the present invention pertains from the following description taken in conjunction with the accompanying figures.

BRIEF DESCRIPTION OF THE FIGURES

The foregoing objects, advantages, and features, as well as other objects and advantages, will become apparent with reference to the description and figures below, in which like numerals represent like elements and in which.

DETAILED DESCRIPTION OF THE PREFERRED EMBODIMENT

Figure 1:
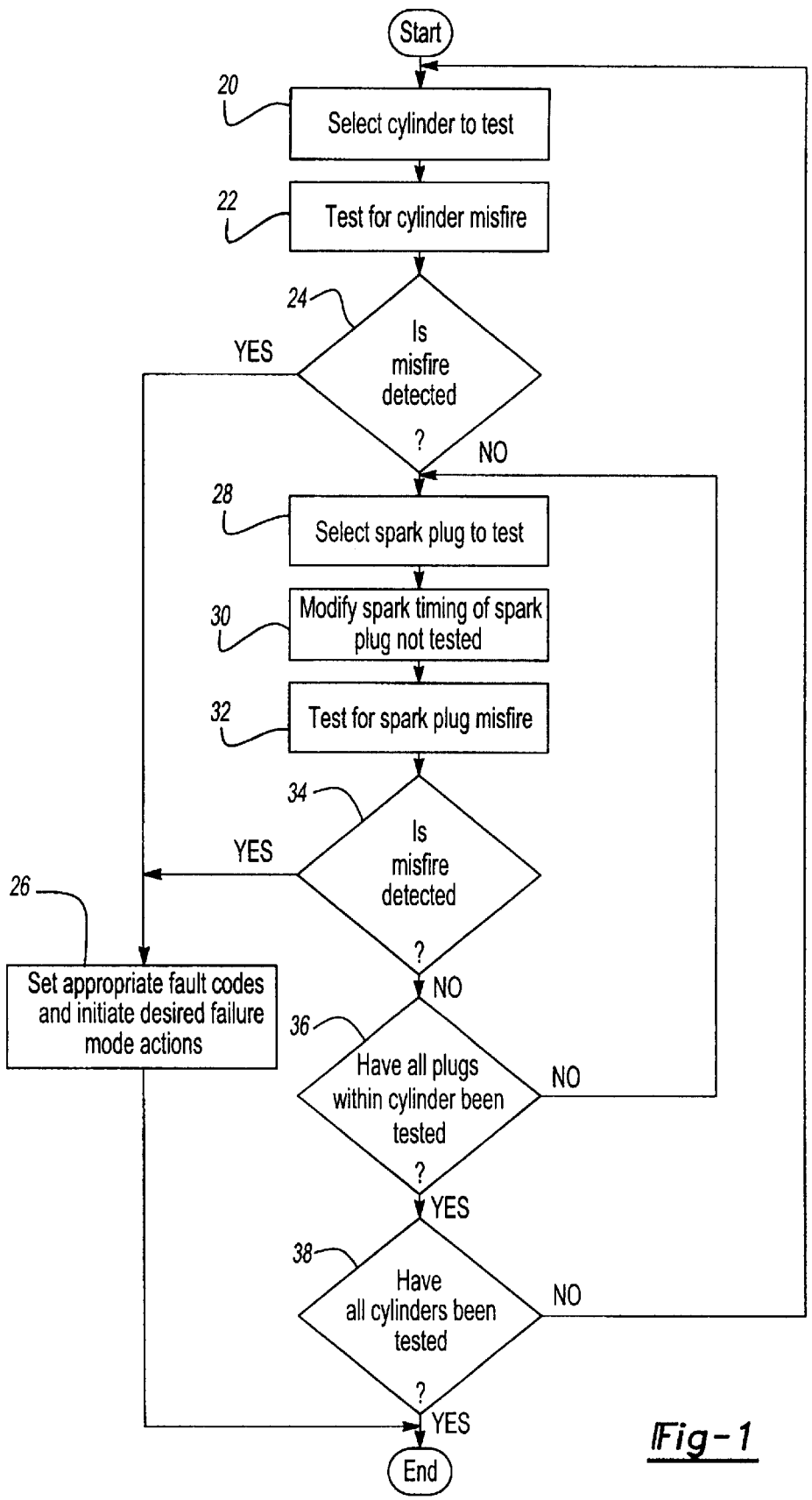
FIG. 1 illustrates a general strategy to detect spark plug misfires in a multiple plug per cylinder internal combustion engine (ICE).

The present invention is an improved strategy for detecting spark plug failure or misfire in an internal combustion engine (ICE) having multiple spark plugs per cylinder. In the preferred embodiment, the strategy assumes the ICE has two spark plugs per cylinder, is capable of adjusting spark timing for each spark plug, and can monitor engine cylinder misfires.

The present invention adjusts spark timing by selecting one spark plug using for example a controller to test and by modifying the spark timing of the other spark plug within the same cylinder. The preferred embodiment of the present invention uses a spark retard strategy to modify spark timing. Here, spark timing is in relation to optimum spark timing, also referred to as Maximum Brake Torque (MBT) timing. In the associated figures, MBT timing has a spark timing of 0 degrees and is also referred to as baseline spark. Spark retard amounts cited herein represent a relative change in crankshaft position in relation to MBT timing. For example, a 10 degree spark retard means the crankshaft angular position at which spark occurs is 10 degrees lagging behind baseline spark (MBT) timing.

The current invention has demonstrated the ability to detect spark plug misfires when the untested spark plug within the same cylinder is at 30 and 50 degrees of retard from baseline as shown below in FIG. 2. Spark retards of 10 degrees also show some signs of fault detection, but the signal is not pronounced enough to threshold in practice. In the preferred embodiment, 50 degrees retard from baseline is preferred. Further, the present invention could easily be adapted for cylinders having more than two spark plugs by maintaining the same level of retard for all the untested spark plugs or by turning off all but one of untested spark plugs.

ICE misfire monitors are known in the prior art and can use measurements such as crankshaft velocity or acceleration. These monitors can use, for example, a prior art engine angular displacement sensor. The preferred embodiment measures crankshaft acceleration.

Generally, the strategy first selects a cylinder to test and measures deviant acceleration of the crankshaft for that cylinder without any spark retard. If misfires are detected, the strategy can immediately go to desired failure mode actions or set diagnostic fault codes. Failure mode actions can include halting fuel supply to the cylinder if a misfire is detected on that cylinder.

If no misfires are detected, the strategy can spark retard the untested plug and again measure any deviant acceleration. If no misfires are detected, the strategy can move to another plug or another cylinder until all spark plugs are tested. The present invention is not limited to any particular sequence of spark plug testing so long as all spark plugs are tested within one cycle of the strategy. If misfires are detected, again, failure mode actions can be initiated if desired.

The present invention provides improvement over the prior art in that the strategy does not require the complete disabling of a spark plug within the same cylinder as the tested spark plug.

FIG. 1 shows the general logic of one cycle of the strategy of the preferred embodiment of present invention. The strategy can be part of a controller such as a vehicle system controller (VSC). At Step 20, the strategy selects a cylinder to test. Next at Step 22, the strategy tests the cylinder for spark plug misfire. The preferred embodiment can test for deviant crankshaft acceleration using an engine angular displacement sensor (not shown). At Step 24, the strategy determines whether a misfire is occurring in that cylinder. If yes, the strategy can move to Step 26 to set appropriate fault codes and initiate any desired failure mode actions.

If no misfires are detected at Step 24, the strategy selects a spark plug within the cylinder to test at Step 28. Next, spark timing is modified at Step 30 for the spark plug not tested within the cylinder of the spark plug being tested. As described, a spark retard at 50 degrees from baseline is preferred, although the optimized value will most likely differ based on engine design.

Next, the system again tests the cylinder for spark plug misfire at Step 32. If a spark misfire is detected at Step 34, the strategy again initiates setting of appropriate fault codes and failure mode actions (if desired) at Step 26.

If no misfires are detected at Step 34, the strategy can determine if all the plugs in the cylinder have been tested at Step 36. If not, the strategy returns to Step 28. If all the spark plugs in the cylinder have been tested, the strategy next determines if all cylinders of the ICE have been tested at Step 38. If no, the strategy returns to Step 20 to begin testing for an untested cylinder. If all the cylinders have been tested, the cycle has completed and the strategy ends.

FIG. 2 shows waveform analysis of a spark plug misfire monitor at various sparking conditions for one cylinder: 2a shows the acceleration signal with normal baseline spark; 2b shows 10 degrees of spark retard from baseline for the untested spark plug; 2c shows 30 degrees of spark retard from baseline; 2d shows 50 degrees (preferred) of spark retard from baseline; and 2e shows a waveform of an induced cylinder misfire.

In each waveform, an X-axis 40 is a function of a sample number with each sample taken at an interval of 5 milliseconds. The time duration of the entire trace is 6 seconds. A Y-axis 42 is a unitless rate of measured crankshaft acceleration.

Figure 2A:
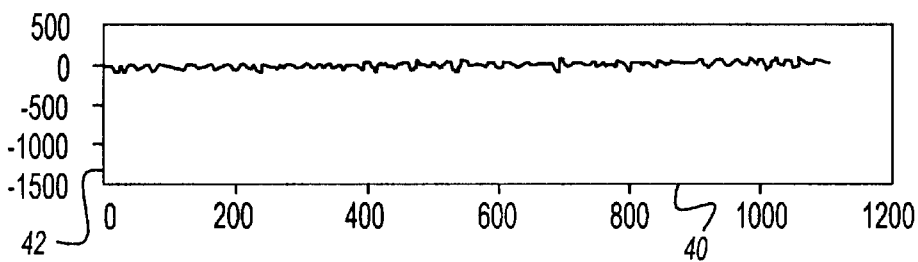
FIG. 2 illustrates sample crankshaft accelerations over time for normal baseline spark, spark-misfire, and at 10, 30 and 50 degrees of retard from baseline spark timing.
Figure 2B:
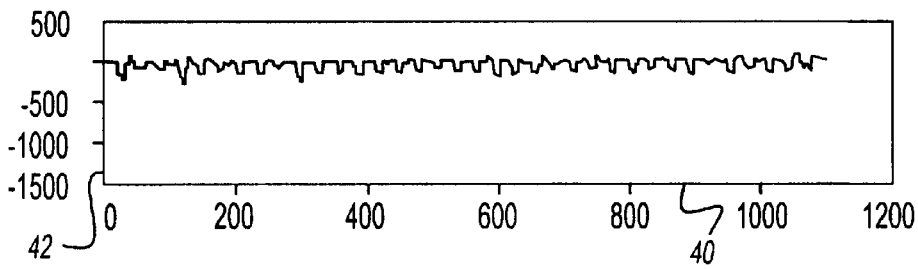
Figure 2C:
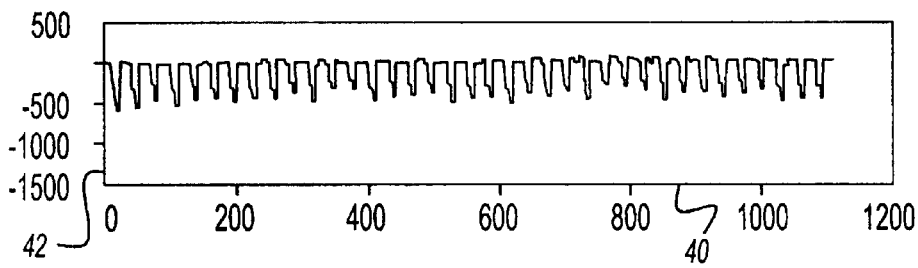
Figure 2D:
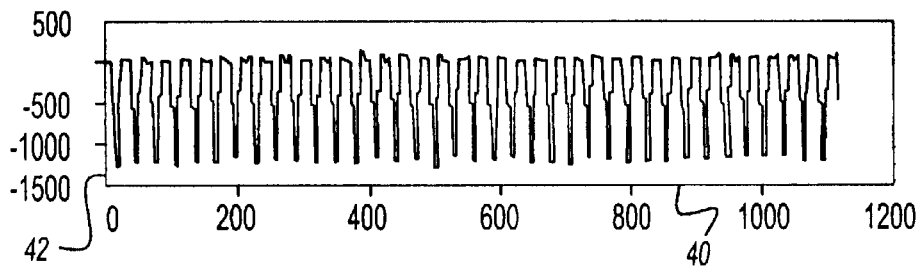
Figure 2E:
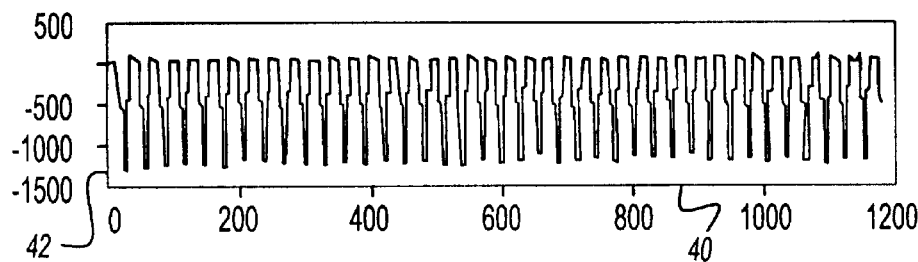

FIG. 2d shows that a spark retard of 50 degrees from baseline spark timing will produce an acceleration signal comparable to a complete misfire (shown in FIG. 2e). It is not a complete misfire though, because the spark will still burn the air/fuel mixture in the combustion chamber of the engine. A detection threshold can be easily applied to this signal such that exceeding this threshold will indicate a fault condition. Given that the 50 degree retard rate most closely approximates an actual misfire event, this is the best predictor of misfire while still providing improved emissions over the prior art. Nevertheless, spark retards in the 30 to 50 degree range would also provide an acceptable degree of detectability.

Other objects of the present invention will become more apparent to persons having ordinary skill in the art to which the present invention pertains from the following description taken in conjunction with the accompanying figures.

We claim:

1. A method for controlling an internal combustion engine having a plurality of spark plugs associated with each cylinder, the method comprising:
   modifying ignition timing for all but one spark plug associated with a selected cylinder; and
   monitoring at least one engine operating parameter to determine whether the one spark plug is misfiring.

2. The method of claim 1 wherein the step of modifying comprises retarding ignition timing.

3. The method of claim 1 further comprising:
   repeating the steps of modifying and monitoring for each of the plurality of spark plugs associated with the selected cylinder.

4. The method of claim 3 further comprising:
   repeating the step of repeating for each cylinder.

5. The method of claim 1 wherein the step of monitoring comprises monitoring variation in crankshaft rotation.

6. A method for detecting spark plug misfire in an internal combustion engine having a plurality of spark plugs associated with each cylinder, the method comprising:

firing a first one of the plurality of spark plugs associated with a first cylinder;

substantially simultaneously firing remaining spark plugs associated with the first cylinder after firing the first spark plug to initiate combustion within the first cylinder if the first spark plug misfires; and monitoring crankshaft rotation to determine whether the first spark plug misfired.

7. The method of claim 6 wherein the step of monitoring comprises monitoring crankshaft angular acceleration.

8. A method for controlling a multiple plug per cylinder internal combustion engine to detect spark plug misfire, the method comprising:

modifying relative ignition timing between or among spark plugs associated with a particular cylinder to determine whether one spark plug's contribution to crankshaft angular acceleration is significantly different from the remaining spark plug(s)' contribution to crankshaft angular acceleration associated with the particular cylinder without disabling firing of any of the spark plugs associated with the particular cylinder.

9. The method of claim 8 wherein the internal combustion engine includes two spark plugs per cylinder and wherein the step of modifying includes retarding ignition timing of the second spark plug relative to the first spark plug, the method further comprising:

determining crankshaft angular acceleration associated with firing the first spark plug; and comparing the angular acceleration to a threshold to determine whether the first spark plug misfired.

10. A method for detecting spark plug misfire in a multiple cylinder internal combustion engine having first and second spark plugs associated with each cylinder, the method comprising:

firing the first spark plug associated with a particular cylinder; and subsequently firing the second spark plug associated with the particular cylinder to allow monitoring of crankshaft rotation associated with the firing of the first spark plug to detect misfire while still initiating combustion within the cylinder when the first spark plug misfires.

11. A method for detecting spark plug misfire in a multiple cylinder internal combustion engine having at least two spark plugs per cylinder, the method comprising:

monitoring crankshaft rotation to detect a cylinder misfire in which all spark plugs associated with a particular cylinder misfire;

selecting a first cylinder and a first spark plug associated with the first cylinder for testing during a first combustion cycle;

firing the first spark plug;

monitoring crankshaft rotation associated with firing the first spark plug to detect whether the first spark plug misfired; and firing at least one of the remaining spark plugs associated with the first cylinder during the first combustion cycle, wherein firing of the at least one remaining spark plug initiates at least partial combustion within the first cylinder in the event that the first spark plug misfired.

12. A system for controlling an internal combustion engine having a plurality of spark plugs associated with each cylinder, the system including an engine controller in communication with the plurality of spark plugs, the controller comprising:

instructions for modifying ignition timing for all but one spark plug associated with a selected cylinder; and instructions for monitoring at least one engine operating parameter to determine whether the one spark plug is misfiring.

13. The system of claim 12 wherein the instructions for modifying ignition timing comprise instructions for retarding ignition timing.

14. The system of the engine controller further comprises:

instructions for repeatedly modifying ignition timing and monitoring at least one engine parameter for each of the plurality of spark plugs associated with the selected cylinder.

15. The system of claim 12 wherein the instructions for monitoring comprise instructions for monitoring variation in crankshaft rotation.

16. A system for detecting spark plug misfire in a multiple cylinder internal combustion engine having at least two spark plugs per cylinder, the system comprising:

a sensor for monitoring crankshaft rotation to detect a cylinder misfire in which all spark plugs associated with a particular cylinder misfire; and a controller in communication with the sensor, the controller selecting a first cylinder and a first spark plug associated with the first cylinder for testing during a first combustion cycle, firing the first spark plug, monitoring crankshaft rotation associated with firing the first spark plug to detect whether the first spark plug misfired, and firing at least one of the remaining spark plugs associated with the first cylinder during the first combustion cycle, wherein firing of the at least one remaining spark plug initiates at least partial combustion within the first cylinder in the event that the first spark plug misfired.

* * * * *